United States Patent [19]

Miyamori

[11] Patent Number: 5,295,248

[45] Date of Patent: Mar. 15, 1994

[54] BRANCH CONTROL CIRCUIT

[75] Inventor: Takashi Miyamori, Tokyo, Japan

[73] Assignee: Kabushiki Kaisha Toshiba, Kawasaki, Japan

[21] Appl. No.: 597,319

[22] Filed: Oct. 15, 1990

[30] Foreign Application Priority Data

Oct. 16, 1989 [JP] Japan .................. 1-266158

[51] Int. Cl.$^5$ ........................... G06F 9/22; G06F 9/42
[52] U.S. Cl. .................................... 395/375; 364/380;
364/261.3; 364/DIG. 1; 364/DIG. 2
[58] Field of Search ................. 395/375; 364/DIG. I, 364/DIG. II

[56] References Cited

U.S. PATENT DOCUMENTS 3,764,988 10/1973 Onishi ................................ 395/375

FOREIGN PATENT DOCUMENTS

| 0236745 | 9/1987 | European Pat. Off. | G06F 9/38 |
| 0320098 | 6/1989 | European Pat. Off. | G06F 9/38 |
| 0394711 | 10/1990 | European Pat. Off. | G06F 9/38 |
| 58-048144 | 3/1983 | Japan | G06F 38 |

OTHER PUBLICATIONS

Rodnay Zaks, "Programming the Z80" 1982 Sybex Inc. p. 290.
Branch-Processing Instruction Cache, IBM Technical Disclosure Bulletin, vol. 29, No. 1, Jun. 1986, New York US pp. 357-359.
A Study of Branch Prediction Strategies, J. Smith, The 8th Annual Symposium On Computer Architecture, Minnesota US, pp. 135-148.

Primary Examiner—David Y. Eng
Attorney, Agent, or Firm—Foley & Lardner

[57] ABSTRACT

A branch prediction control circuit has a register. A main memory provides a machine language instruction to the register and an instruction buffer. The prediction control circuit decodes the instruction held in the register and predicts whether or not the branch is taken. If the instruction is a relative branch instruction, a sum of the address of the instruction and a displacement included in the instruction is computed to provide a branch address. At the same time, a branch address valid signal is provided. With this arrangement, reliable branch prediction of the relative branch instruction is realized with a small amount of hardware.

4 Claims, 9 Drawing Sheets

| INPUTS | | | | | SELECTOR OUTPUTS |
|---|---|---|---|---|---|
| BI[0] | BI[1] | BI[2] | BI[3] | FETCHING PC [29,30] | |
| 0 | 0 | 0 | 0 | X | all 1 |
| 1 | 0 | 0 | 0 | 01 | all 1 |
| X | 1 | 0 | 0 | 10 | all 1 |
| X | X | 1 | 0 | 11 | all 1 |
| 1 | X | X | X | 00 | INPUT [0~15] |
| 0 | 1 | X | X | 0X | INPUT [16~31] |
| 0 | 0 | 1 | X | 0X | INPUT [32~47] |
| 0 | 0 | 1 | X | 10 | INPUT [32~47] |
| 0 | 0 | 0 | 1 | X | INPUT [48~63] |

BRANCH CONTROL CIRCUIT

BACKGROUND OF THE INVENTION

1. Field of the Invention

The present invention relates to a branch control circuit used for pipeline processing of instructions, and particularly to a branch control circuit that can minimize confusion caused by branching in the pipeline processing.

2. Description of the Prior Art

These days, many data processors are employing pipeline processing to process and execute instructions at a high speed.

The pipeline processing involves, for example, an instruction fetching stage, an instruction decoding stage, an effective address generating stage, an operand fetching stage, and an instruction executing stage. Instructions are successively read from a memory and sequentially processed through these pipeline stages. Each of the stages processes a different instruction, and if there is no confusion in the flow in the pipeline stages, the system provides maximum performance.

Let us suppose a data processor consumes one machine cycle in each processing stage, it requires five machine cycles for processing one instruction in a data processor without the pipeline system. On the other hand, a data processor employing the pipeline processing can process instructions five times as fast as the non-pipeline processor, because the pipeline processor executes one instruction in each machine cycle if no confusion occurs in the flow of the pipeline processing.

According to a conventional pipeline technique, however, a branch instruction may cause confusion in the pipeline processing. After executing the branch instruction, the processor must invalidate instructions that are following the branch instruction and being processed in the pipeline stages, and restart processing from a target instruction of the branch. This deteriorates the performance of the pipeline.

To deal with the problem, a processor employing a branch prediction method has been proposed. This method predicts whether or not a branch instruction is taken, according to branch prediction information. If the branch instruction is predicted to be taken, the processor starts to process an instruction addressed by the branch instruction before executing the branch instruction, thereby reducing the confusion which occurs in the pipeline.

According to this technique, some means must be provided to find a target address of the branch instruction. One means for finding the address is a look-up table which is referred to in the instruction fetching stage of the pipeline.

Figure 1:
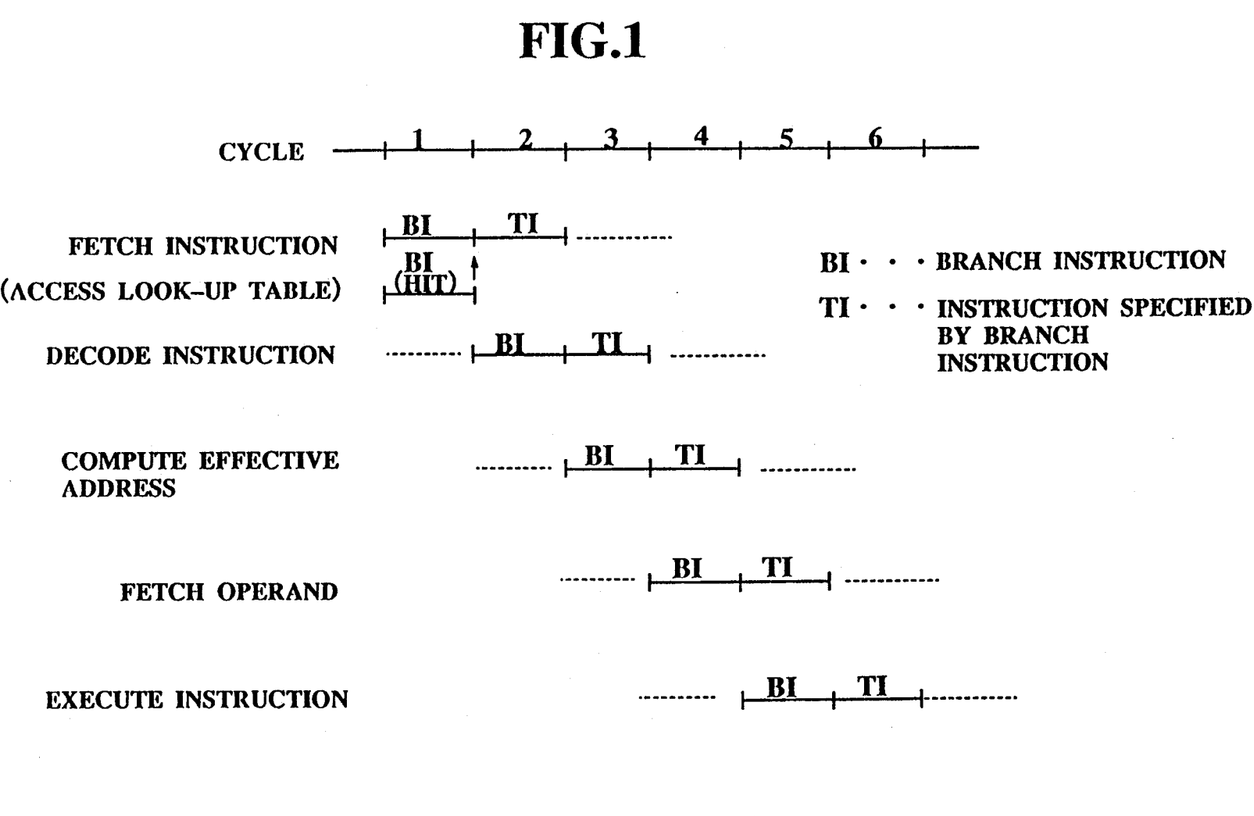
FIG. 1 is a view showing flows of a pipeline process with successful branch prediction, according to a conventional branch control technique.

FIG. 1 shows flows of instructions in pipeline stages of a conventional branch control circuit employing the look-up table.

The look-up table contains addresses of branch instructions BIs and addresses of target instructions TIs. The look-up table is referred to in the instruction fetching stage or instruction decoding stage of the pipeline to find a target address of a branch instruction BI. If the given branch instruction BI is predicted that branch is taken, an instruction located at a target address obtainable from the look-up table is fetched. This technique may minimize confusion in the pipeline, as shown in FIG. 1, if the branch prediction hits.

The look-up table and its contents inevitably increase, however, the size of hardware. In other words, the number of entries of the look-up table is limited by hardware.

If the number of entries of the look-up table is small, a mis-hit rate will rise in referring to the look-up table. This makes the prediction of a branch instruction BI impossible.

Figure 2:
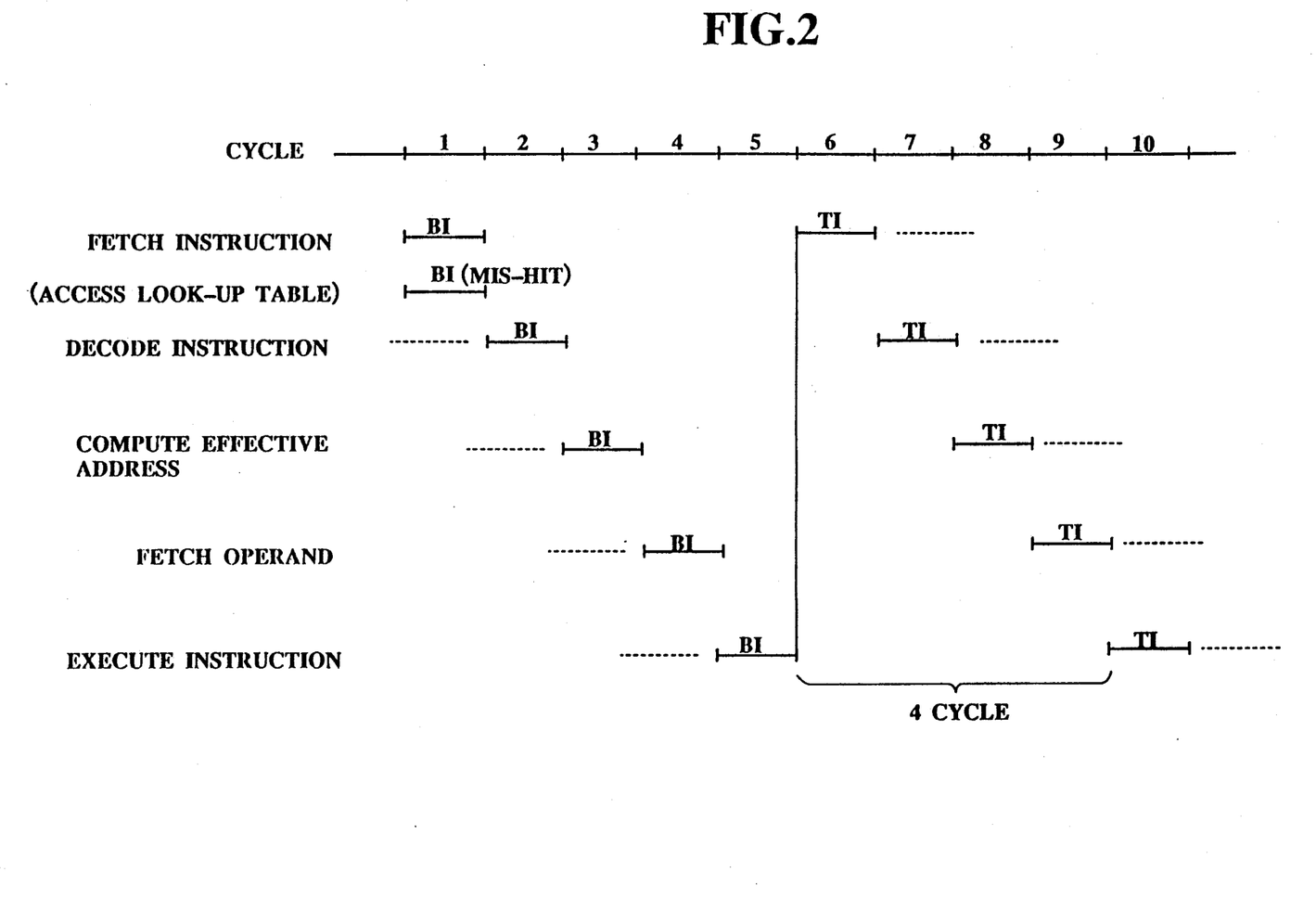
FIG. 2 is a view showing flows of a pipeline process with unsuccessful branch prediction, according to the conventional branch control technique.

In FIG. 2, flows of a pipeline process with unsuccessful branch prediction are shown. As shown in FIG. 2, since an instruction fetch of the target instructions TIs is carried out after executing the branch instruction BI, the process after the first time requires more four cycles than that at the first time.

In this way, the conventional branching control technique for a pipeline system requires the size of hardware (the size of the look-up table) to be sufficiently large for increasing the hit rate of branch prediction. If the number of entries of the look-up table is small, the mis-hit rate increases to cause confusion in the pipeline.

SUMMARY OF THE INVENTION

To solve these problems, an object of the present invention is to provide a branch control circuit that can minimize confusion in the pipeline due to a branch instruction, without increasing the hardware.

In order to accomplish the object, the present invention provides a branch prediction control circuit comprising a first register for holding at least one machine language instruction fetched from a memory; a second register for holding an address of the machine language instruction; a first detection circuit connected to the first register to detect that the first register contains a relative branch instruction which is predicted to be taken, and provide a branch address valid signal; and an adder for adding a displacement included in the relative branch instruction to the address held in the second register and providing a branch target address.

According to a branch control circuit of the present invention, a sub-decoding circuit is arranged outside a main decoding circuit. The sub-decoding circuit handles only a short format relative branch instruction that frequently appears, to predict whether or not the branch instruction is taken. A branch address is found by adding the address of the relative branch instruction to a displacement contained in the branch instruction. This branch control circuit of the present invention can be formed with small hardware. Since the present invention does not require branch addresses to be stored, the memory for storing the branch addresses can be omitted, and confusion caused by successful branching in a pipeline can be minimized.

These and other objects, features and advantages of the present invention will be more apparent from the following detailed description of preferred embodiments in conjunction with the accompanying drawings.

DETAILED DESCRIPTION OF THE EMBODIMENTS

Figure 3:
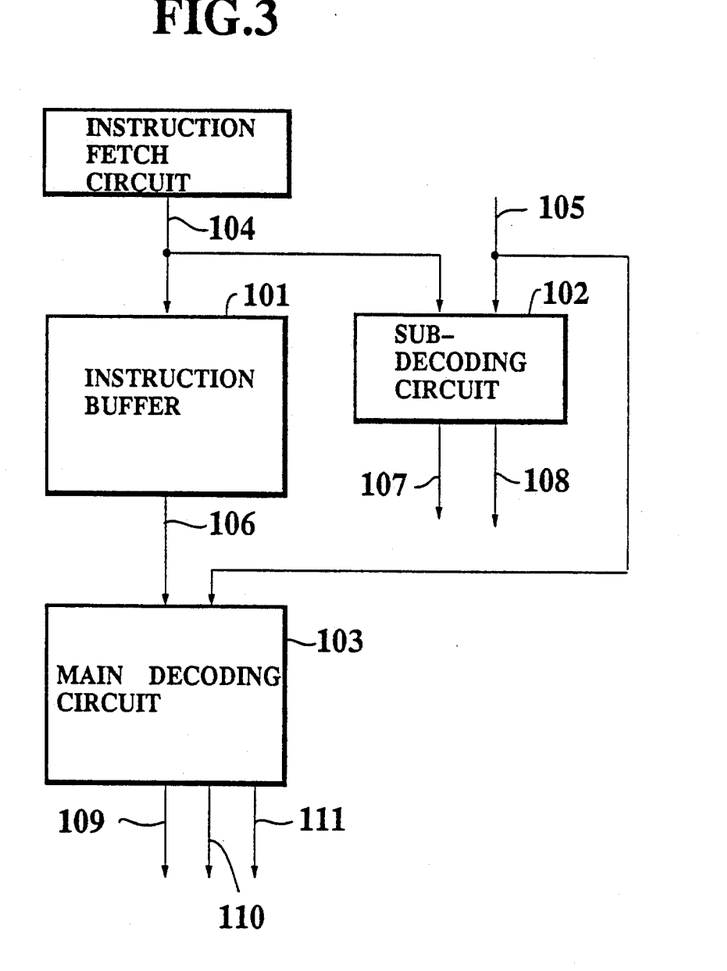
FIG. 3 is a block diagram showing a basic arrangement of a branch control circuit according to the present invention.

FIG. 3 shows a branch control circuit according to an embodiment of the present invention.

The branch control circuit comprises an instruction buffer 101 for holding instructions that are provided in an instruction fetching stage of a pipeline process, a sub-decoding circuit 102 for decoding only a short format relative branch instruction, and a main decoding circuit 103 for decoding a normal-type relative branch instruction.

In operation, the sub-decoding circuit 102 decodes only a short format relative branch instruction, for branch prediction. The main decoding circuit 103 receives first one of instructions stored in the instruction buffer 101 through a signal line 106, and decodes into an internal instruction, which is provided to a signal line 109 for later processes. Also, the main decoding circuit 103 predicts whether or not a general format relative branch instruction is taken, and provides a branch target address to a signal line 111 and a branch address valid signal to a signal line 110.

Figure 4:
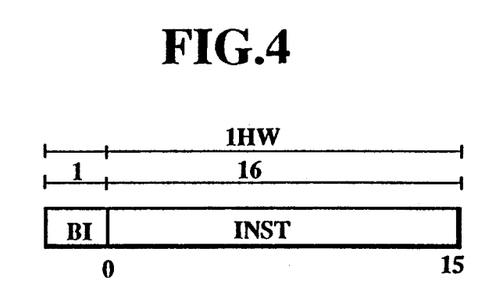
FIG. 4 is a view showing a format of instruction used by the branch control circuit of the present invention.

FIG. 4 shows an instruction format employed by the present invention. A basic unit of this format is one half word (HW) and has a variable length. An instruction of one half word comprises a field BI containing branch prediction information, and a field INST containing an instruction function and operand information. In this embodiment, the field BI comprises one bit, which will be "1" when the field INST following the field BI is a head of a branch instruction and when the branch instruction is predicted to be taken, and will be "0" in other cases. The field INST comprises sixteen bits.

The instruction fetch circuit provides instructions of aligned four half words to the instruction buffer 101 in one cycle. The instruction buffer 101 is capable of storing, for example, eight half words of instructions, and provides first three half words of instructions to the main decoding circuit 103 through the line 106.

Figure 5:
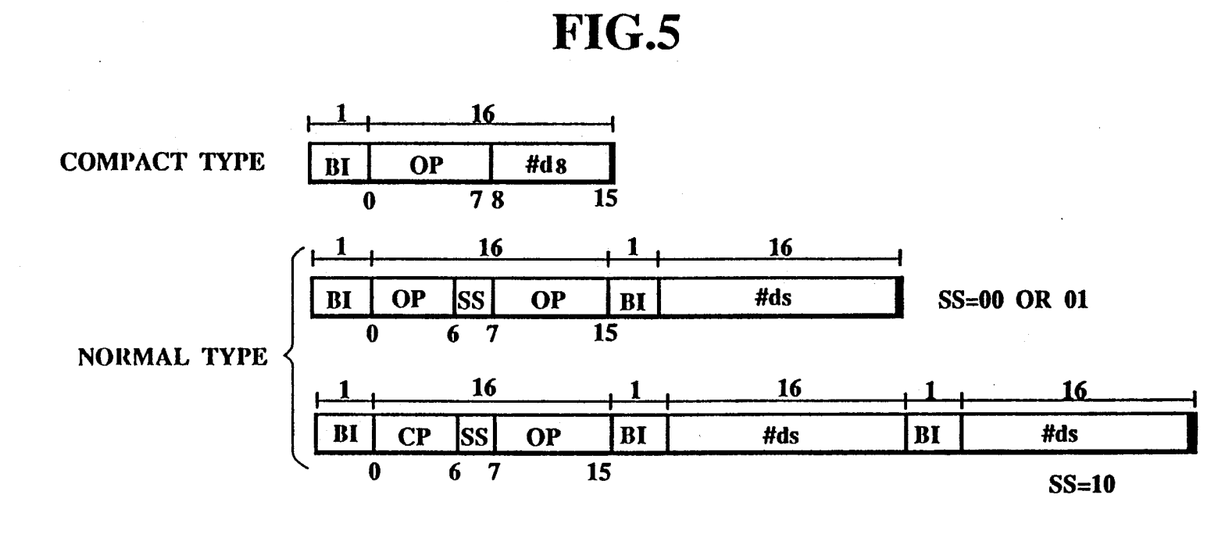
FIG. 5 is a view showing various formats of relative branch instruction used by the branch control circuit of the present invention.

FIG. 5 shows formats of short format and general format relative branch instructions employed by the prediction control circuit of the present invention. A sum of the address of a branch instruction and a displacement contained in the branch instruction is used as a branch target address.

The short format relative branch instruction is one half word in length. Bits 0 to 7 of field INST of this instruction represent an operation code (OP code), and bits 8 to 15 represent a displacement (#d8).

A double of the displacement #d8 defines a difference between the address of the branch instruction and the branch target address.

The general format relative branch instruction may include a displacement of eight, sixteen, or thirty-two bits. If the displacement size is eight bits, a field SS of the instruction will be "00". If the displacement size is sixteen bits, the field SS of the instruction will be "01". In this case, the instruction comprises two half words, in which the first one indicates a function of the instruction, and the second one indicates a displacement. If the displacement size is thirty-two bits, the field SS of the instruction will be "10". In this case, the instruction comprises three half words, in which the first one indicates a function of the instruction, the second one indicates upper sixteen bits of a displacement, and the third one indicates lower sixteen bits of the displacement.

The sub-decoding circuit 102 handles only the short format relative branch instruction, and predicts whether or not the branch is taken.

Figure 6:
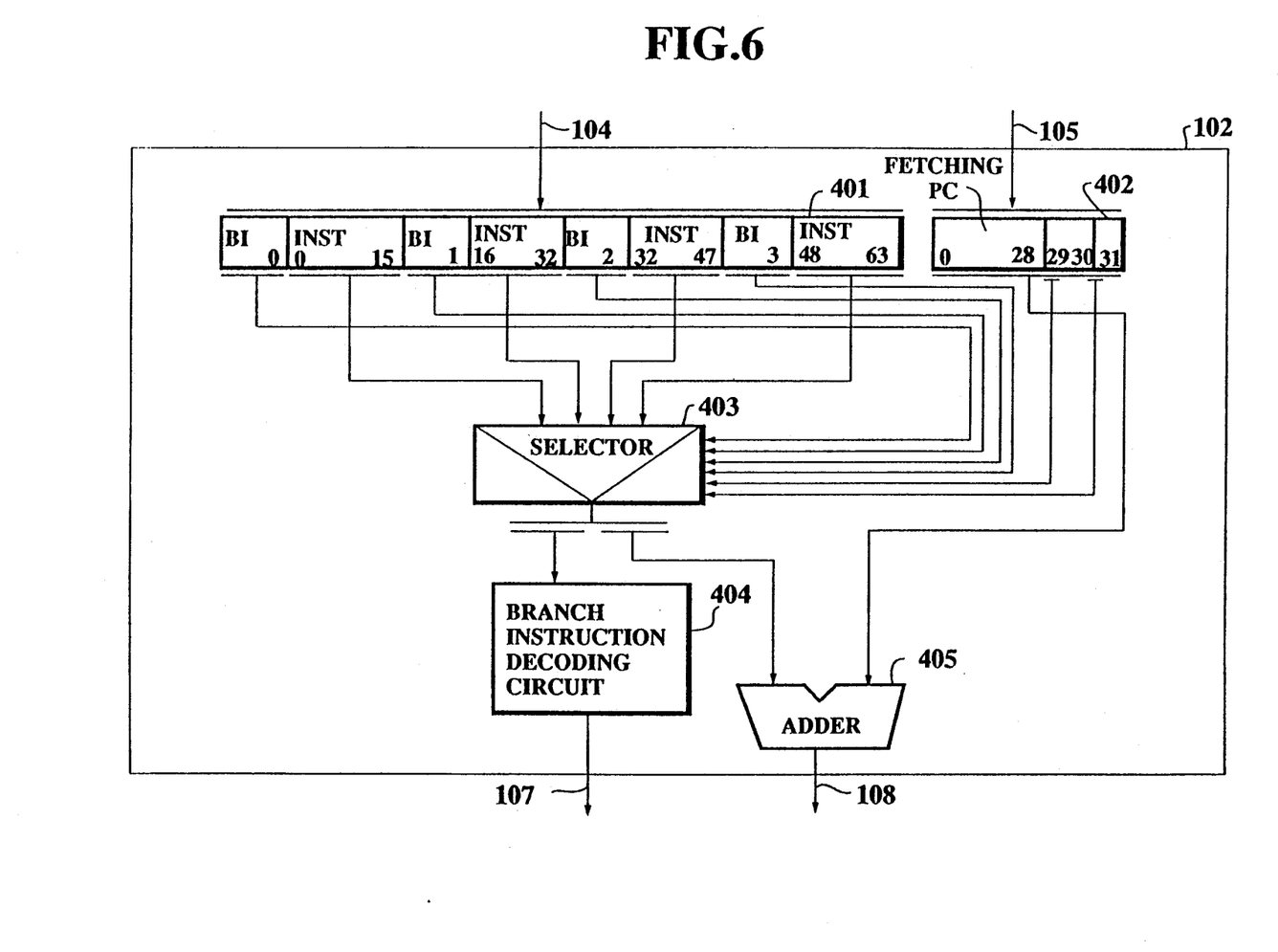
FIG. 6 is a detailed circuit diagram showing a sub-decoding circuit of FIG. 3.

FIG. 6 is a detailed circuit diagram showing the sub-decoding circuit 102 of FIG. 3.

The sub-decoding circuit 102 comprises an instruction latch 401, a fetching PC 402, a selector 403, a branch instruction decoding circuit 404, and an adder 405.

In operation, instructions of four half words are read from the instruction fetch circuit through the line 104, and stored in the instruction latch 401. A first address of the read instructions is stored in the fetching PC 402 through a line 105. Since a minimum instruction unit is a half word, a bit 31 of the fetching PC 402 is always "0".

Instructions are aligned in four half words. An instruction with bits 29 and 30 of its address being "00" is stored in a field INST[0-15] of the instruction latch 401, an instruction with bits 29 and 30 being "01" in a field INST16-31], an instruction with bits 29 and 30 being "10" in a field INST[32-47], and an instruction with bits 29 and 30 being "11" in a field INST[48-63]. When instructions are successively fetched, the bits 29 and 30 of the fetching PC 402 are "00" and all four half words of the instruction latch 401 are valid.

When a branch target instruction is fetched, the bits 29 and 30 of the fetching PC 402 indicate a branch target address, and in the instruction latch 401, only the fields after the branch address are valid. For example, if the bits 29 and 30 of the fetching PC 402 are "10", the fields INST[32-47] and INST[48-63] and fields BI[2] and BI[3] are valid.

The selector 403 selects one of the four half words stored in the instruction latch 401 according to bits of the fields BI[0] to BI[3] of the instruction latch 401 and the bits 29 and 30 of the fetching PC 402. The selector 403 then provides the selected half word to the branch instruction decoding circuit 404 and adder 405.

Figure 7:
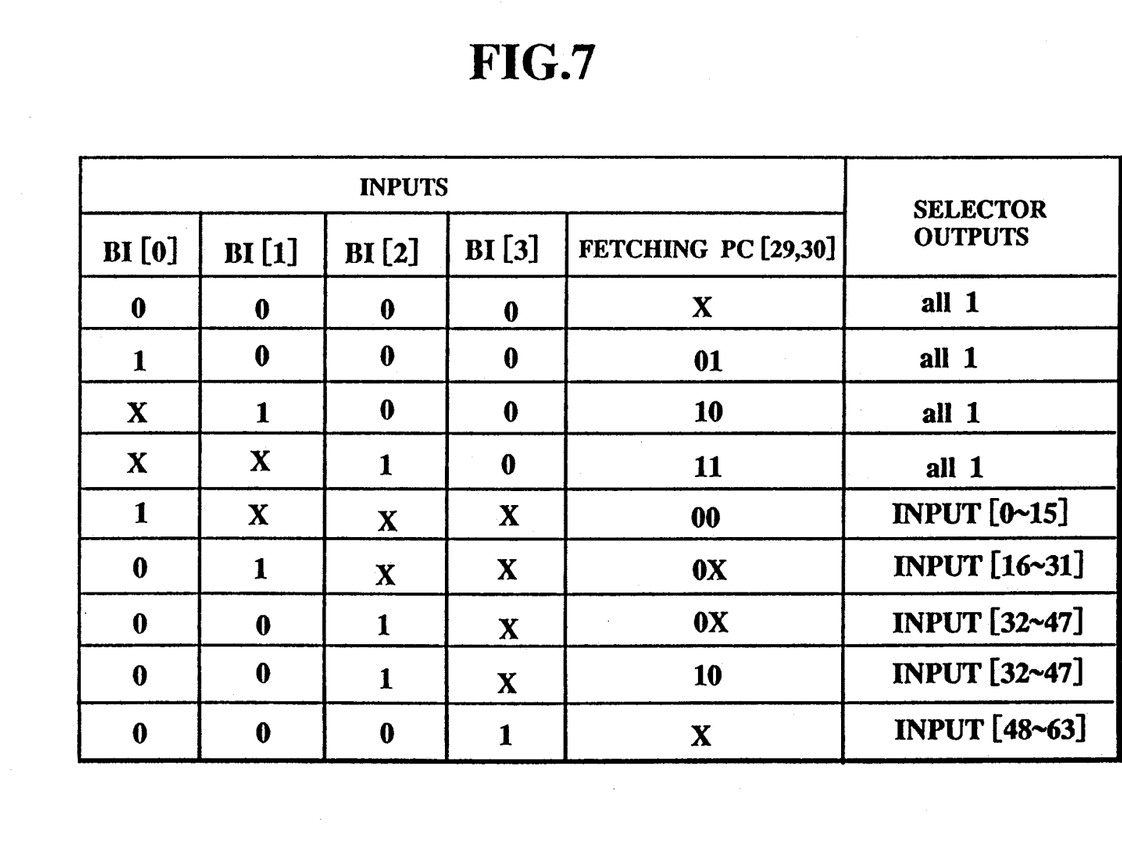
FIG. 7 is a table showing relations between branch prediction information, bit statuses of a fetching PC, and selector outputs of FIG. 6.

FIG. 7 is a table showing statuses of the bits 29 and 30 of the fetching PC 402 and statuses of the branch prediction information bits BI[0] to BI[3] of the instruction latch 401, and outputs of the selector 403 corresponding to these statuses. Supposing the bits 29 and 30 of the fetching PC 402 are "10" with BI[0]=0, BI[1]=0 and BI[2]=1, the selector 403 selects the field INST[32-47]of the instruction latch 401.

If the latch 401 is storing a branch instruction which is predicted to be taken, the selector 403 selects the branch instruction of half word and provides the same to the branch instruction decoding circuit 404 and adder 405. If the instruction latch 401 is storing no branch instruction which is predicted to be taken, i.e., if all bits of the fields BI[0] to BI[3] are each 0, the selector 403 provides all "1".

The branch instruction decoding circuit 404 receives an upper byte of the output of the selector 403. If the upper byte coincides with one of operation code field OPs of short format relative branch instructions, the circuit 404 asserts a branch address valid signal 107. The bit pattern of all "1" does not coincide with any operation code field OPs of the short format relative branch instruction. In this case, the circuit 404 doesn't assert a branch address valid signal 107.

The adder 405 adds a value obtainable by shifting a lower byte of the output of the selector 403 by one bit to the left to a value of the fetching PC 402, and provides a result of the addition to a signal line 108.

Figure 8:
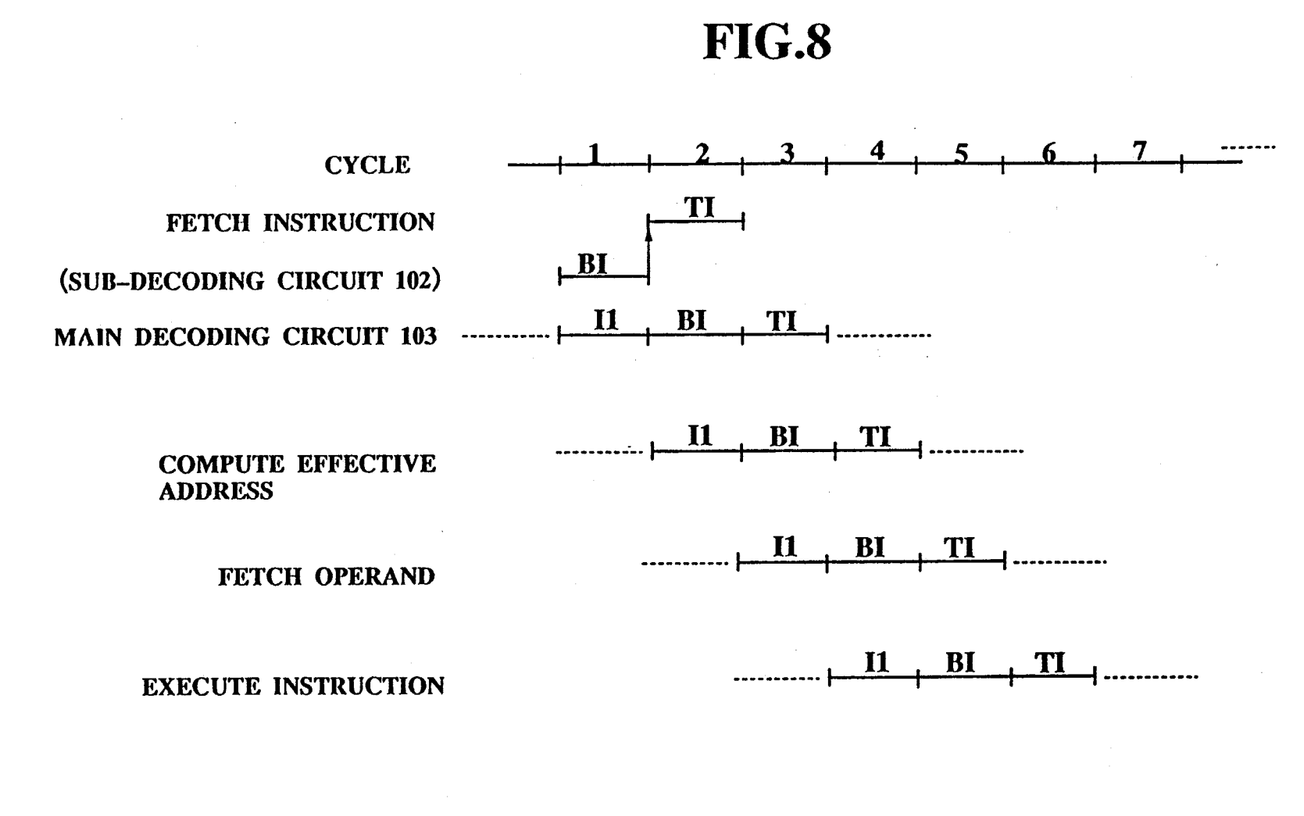
FIG. 8 is a view showing flows of a pipeline process and explaining a branch predicting operation of the sub-decoding circuit.

FIG. 8 shows flows of a pipeline process with the sub-decoding circuit 102 carrying out branch prediction according to the present invention.

In the figure, the sub-decoding circuit 102 and instruction buffer 101 of FIG. 3 simultaneously receive a new instruction, and the sub-decoding circuit 102 decodes the instruction in this cycle. Since the main decoding circuit 103 decodes first one of instructions stored in the instruction buffer 101, the sub-decoding circuit 102 and main decoding circuit 103 simultaneously decode different instructions, respectively, in cycle 1 of FIG. 8. The decoding in the sub-decoding circuit 102 is carried out only to confirm a short format relative branch instruction.

Usually, before an instruction processed by the sub-decoding circuit 102 starts to be processed by the main decoding circuit 103, preceding instructions stored in the instruction buffer 101 are processed in the main decoding circuit 103. In FIG. 6, preceding instruction I1 decodes in the main decoding circuit 103 in cycle 1. An important thing is that a branch instruction BI is followed, just after it, by a target instruction TI. In this case, if branch prediction is correct, the pipeline process will not be disturbed by the branching.

Figure 9:
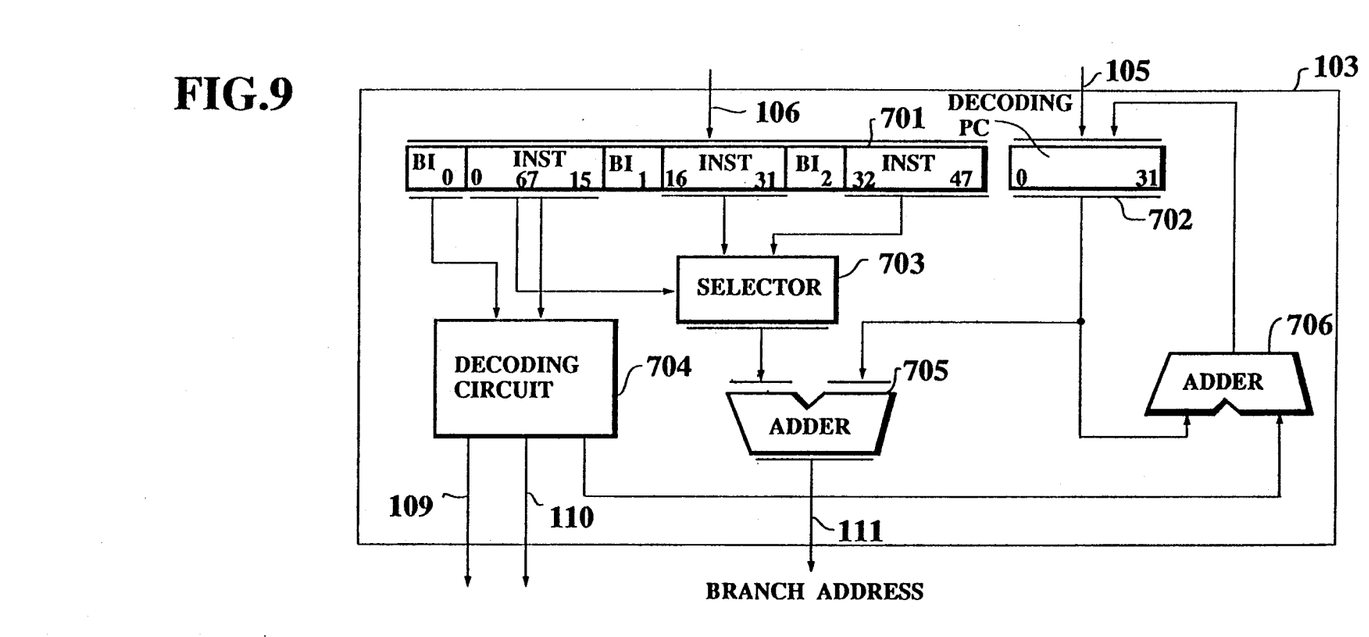
FIG. 9 is a detailed circuit diagram showing main decoding circuit of FIG. 3.

FIG. 9 is a detailed circuit diagram showing the main decoding circuit 103 of FIG. 3.

The main decoding circuit 103 comprises an instruction latch 701 that is a shift register, a decoding PC 702, a selector 703, a decoding circuit 704, a first adder 705, and a second adder 706. Instructions of three half words are given from the instruction buffer 101 to the main decoding circuit 103, and stored in the instruction latch 701.

Among the instructions of three half words, a first half word including a field BI[0] and a field INST[0–15] is provided to the decoding circuit 704. The decoding circuit 704 converts the instruction into an internal instruction, which is supplied to an effective address computing portion through the signal line 109. The length of the decoded instruction is provided to the second adder 706.

The second adder 706 adds the contents of the decoding PC 702, i.e., an address of the first half word of the instruction latch 701 to the decoded instruction length provided by the decoding circuit 704. When the next instruction is supplied from the instruction buffer 101 to the main decoding circuit 103, an output of the second adder 706 is stored in the decoding PC 702.

If a branch is taken, an instruction fetch address is stored in the decoding PC 702 from an instruction fetching portion through the line 105.

When the field BI[0] is "1" and the field INST[0–15] coincides with a bit pattern of a general format relative branch instruction of two or three half words in length, the decoding circuit 704 provides a branch address valid signal 110. At this moment, a branch address has been computed already by the selector 703 and first adder 705. The selector 703 selects a displacement included in the general format relative branch instruction. The size of the displacement is indicated by a section SS of bits 6 and 7 of the field INST[0–15] of the instruction.

Figure 10:
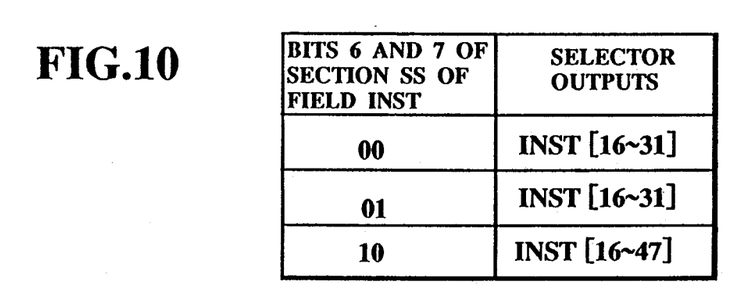
FIG. 10 is a table showing relations of bit statuses of a field SS and selector outputs.

FIG. 10 is a table showing relations between bit statuses of the field SS of the first half word and selected outputs of the selector 703.

In FIG. 9, the first adder 705 adds a value of the decoding PC 702 to a displacement (bit values of corresponding one of the INST fields of FIG. 10) of the relative branch instruction that is a selected output of the selector 703, thereby finding a branch target address, which is supplied to a signal line 111.

Figure 11:
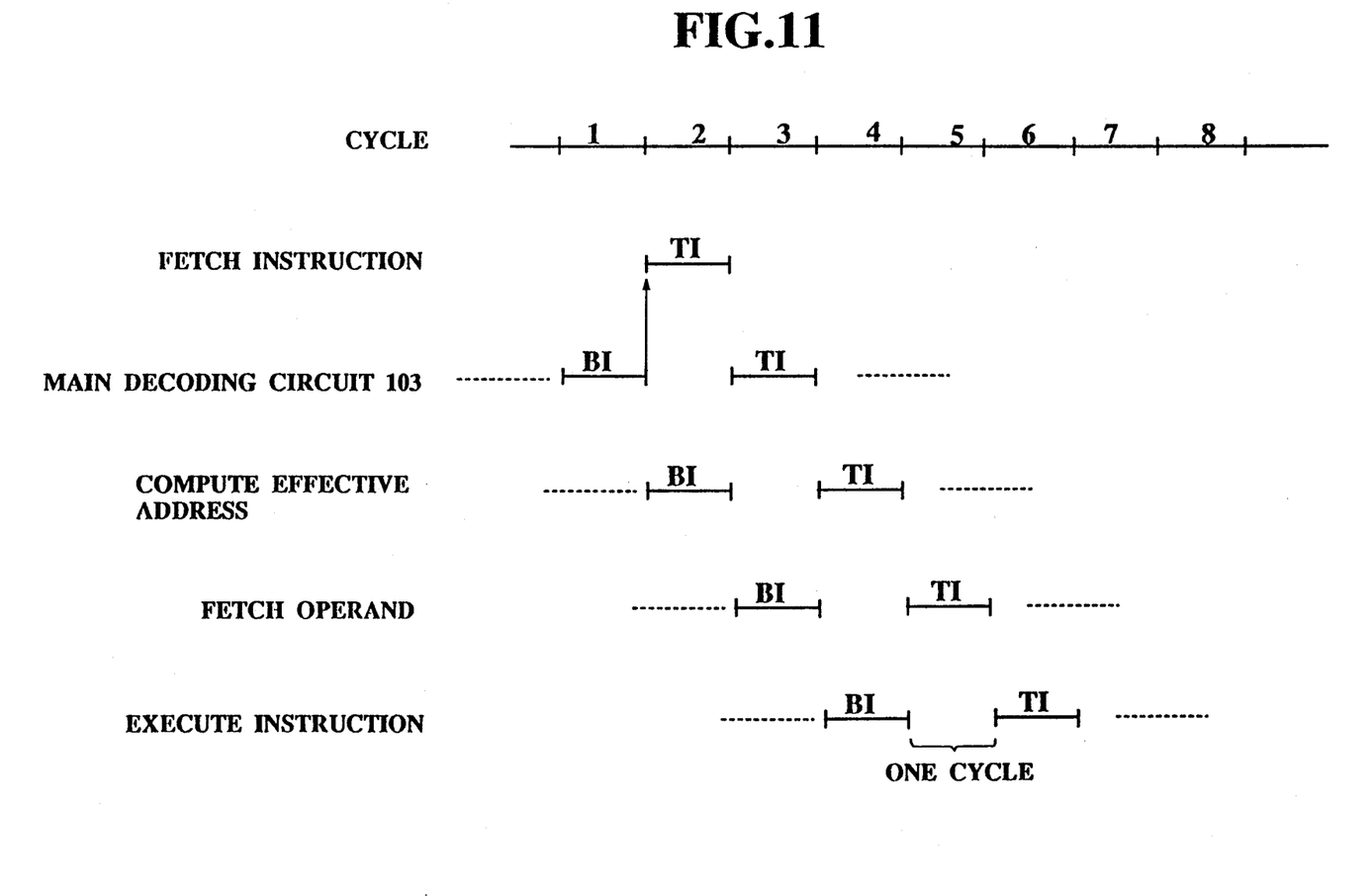
FIG. 11 is a view showing flows of a pipeline process and explaining a branch predicting operation of the main decoding circuit.

FIG. 11 is a view showing pipeline flows with the main decoding circuit 103 of FIG. 9 carrying out branch prediction. In cycle 1, the main decoding circuit 103 decodes a branch instruction BI that has been predicted that branch is taken. In cycle 2, an instruction TI specified by the branch instruction is fetched. In cycle 3, the fetched instruction TI is decoded by the main decoding circuit 103. Accordingly, only one cycle of the pipeline process may be disturbed between the branch instruction BI and the instruction TI.

As explained above, according to the embodiment of the present invention, the branch prediction information field BI of one bit is provided for each half word, and it will be "1" if the branch prediction is taken, and "0" if it will be not taken. In this way, prediction is made for each branch instruction.

The field BI may comprise more than one bit to hold a history of directions of several past branches to carry out branch prediction based on the history.

The main decoding circuit 103 may be modified to carry out branch prediction on an unconditional branch instruction, which is one of short format relative branch instructions having a field BI of "0" and on which the sub-decoding circuit 102 may not carry out the branch prediction.

Various modifications will become possible for those skilled in the art after receiving the teachings of the present disclosure without departing from the scope thereof.

What is claimed is:

1. A branch prediction control circuit comprising:
    an instruction fetch circuit for holding a fetch address and fetching an instruction together with branch information about branch prediction;
    a sub-decoding circuit connected to said instruction fetch circuit for receiving the fetch address and the instruction corresponding to the fetch address together with the branch information, said sub-decoding circuit comprising a first adder for generating a branch address by adding a displacement included in the instruction to said fetch address and a branch instruction decoder for outputting a first branch address valid signal indicative that said branch address is valid if the instruction is a short format relative branch instruction and predicted to be taken;

an instruction buffer for holding the fetch address and fetching the instruction together with the branch information at the same time as said sub-decoding circuit; and a main decoding circuit comprising a decoder for receiving the instruction together with the branch information and decoding the instruction in order to enable execution of the instruction, a first selector for selecting a field corresponding to the displacement of the instruction, a second adder for generating a branch address by adding the displacement outputted from said selector to the address of the instruction, said main decoding circuit outputting a second branch address valid signal indicative that the branch address is valid if the instruction is a general format relative branch instruction and predicted to be taken.

2. The circuit as claimed in claim 1, wherein said subdecoding circuit receives a plurality of instructions together with the branch information and is provided with a second selector for selecting an earliest branch instruction out of the instructions whose branch is predicted to be taken, and outputs said selected instruction to said decoder.

3. A branch prediction control circuit comprising:
a first register for holding at least one machine language instruction fetched from a main memory;
a second register for holding an address of the machine language instruction;
a first detection circuit connected to said first register, for detecting that the first register contains a relative branch instruction that is predicted to be taken, and provide a branch address valid signal;

an adder for adding a displacement included in the relative branch instruction to the address held in said second register, and providing a branch address;
an instruction buffer for holding a machine language instruction provided by the main memory at the time when the same instruction is provided to said first register; and
a main decoding circuit for decoding machine language instructions held in the instruction buffer, the main decoding circuit comprising
a third register for holding the machine language instruction provided by the instruction buffer;
a fourth register for holding an address of the machine language instruction;
a second detection circuit connected to the third register, for decoding the machine language instruction held in the third register to detect whether the machine language instruction is a relative branch instruction, and providing a branch address valid signal; and
an adder for adding a displacement included in the relative branch instruction to the address held in the fourth register, and providing a branch address.

4. A branch prediction control circuit as claimed in claim 3, wherein the second detection circuit refers to a branch information bit which is added to the machine language instruction to indicate whether or not the branch is taken, provides a signal indicating that the branch address provided by the adder is valid, and decodes an operation code of the machine language instruction into an internal instruction.

* * * * *